(12) United States Patent
Bracegirdle

(10) Patent No.: US 6,971,784 B1
(45) Date of Patent: Dec. 6, 2005

(54) PROCESS FOR PRODUCING FIBER REINFORCED HOT-MIX ASPHALTIC AND CEMENTITOUS STRUCTURAL MATERIALS WITH FIBER PELLETS PRODUCED FROM CARPET WASTE

(76) Inventor: Paul E. Bracegirdle, 9 Crimson Leaf Dr., Newtown, PA (US) 18940

(*) Notice: Subject to any disclaimer, the term of this patent is extended or adjusted under 35 U.S.C. 154(b) by 157 days.

(21) Appl. No.: 10/641,410

(22) Filed: Aug. 15, 2003

Related U.S. Application Data

(60) Provisional application No. 60/424,279, filed on Nov. 6, 2002, provisional application No. 60/408,764, filed on Sep. 6, 2002.

(51) Int. Cl.$^7$ ............................................. B28C 5/40
(52) U.S. Cl. ............................................. 366/7; 366/6
(58) Field of Search ...................... 366/1–2, 4, 6–8, 366/22–25

(56) References Cited

U.S. PATENT DOCUMENTS

| | | | |
|---|---|---|---|
| 3,885,774 A | * | 5/1975 | Harris et al. |
| 4,092,737 A | * | 5/1978 | Sandell |
| 4,662,759 A | * | 5/1987 | Leibee et al. |
| 4,706,893 A | * | 11/1987 | Brock |
| 4,887,908 A | * | 12/1989 | Montgomery et al. |
| 4,955,721 A | * | 9/1990 | Clark et al. |
| 5,028,266 A | | 7/1991 | Rettenmaier |
| 5,407,139 A | * | 4/1995 | Mleczewski |
| 5,590,976 A | * | 1/1997 | Kilheffer et al. |
| 6,183,123 B1 | * | 2/2001 | Sniegowski et al. |

FOREIGN PATENT DOCUMENTS

| | | | |
|---|---|---|---|
| DE | 3927252 A1 | * | 2/1991 |
| DE | 4244559 A1 | * | 7/1994 |
| EP | 499572 A1 | * | 8/1992 |
| EP | 509893 A1 | * | 10/1992 |
| FR | 2682608 A1 | * | 4/1993 |
| FR | 2814979 | * | 4/2005 |
| JP | 2002-187124 | * | 7/2005 |
| WO | 95/09723 | * | 4/1995 |
| WO | 02/083590 | * | 10/2002 |

OTHER PUBLICATIONS

3M Scotchcast Polyolefin Fibers Case History (2 Pages).
3M Scotchcast Polyolefin Fibers Technical Data (5 Pages).
Item 400HS Standard Specification Dec. 1996.

\* cited by examiner

*Primary Examiner*—Charles E. Cooley
(74) *Attorney, Agent, or Firm*—Daniel Kramer

(57) ABSTRACT

A process for effectively mechanically disrupting fiber pellets produced from waste carpet material into their individual strands and for insertion and uniform distribution of such fibers through congealable materials such as asphalt and concrete, thereby providing improved physical properties to the resultant solids and, by providing a use for such waste carpeting, minimizing their deposition in landfills.

24 Claims, 3 Drawing Sheets

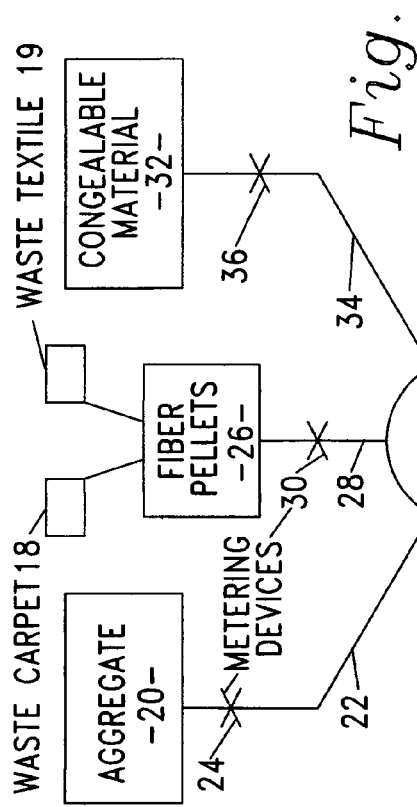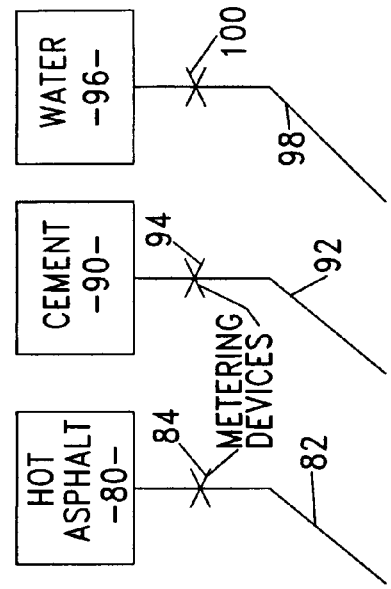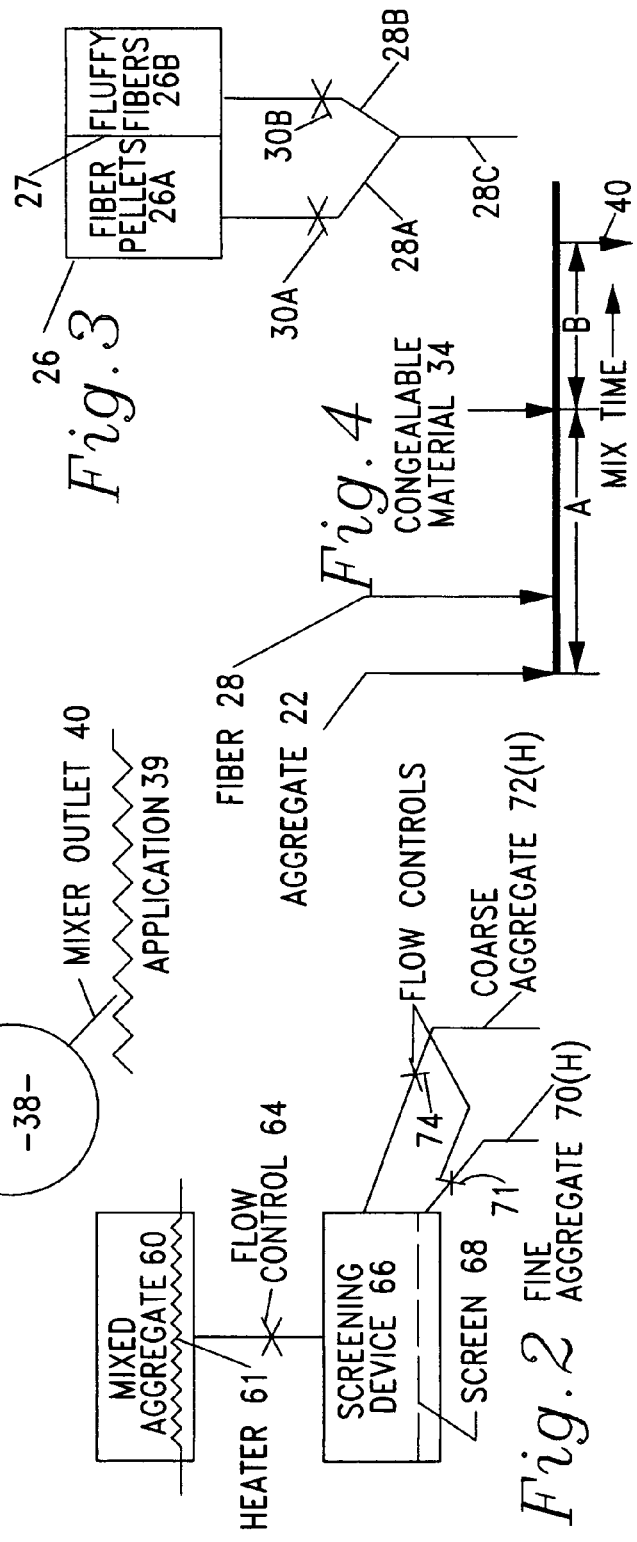

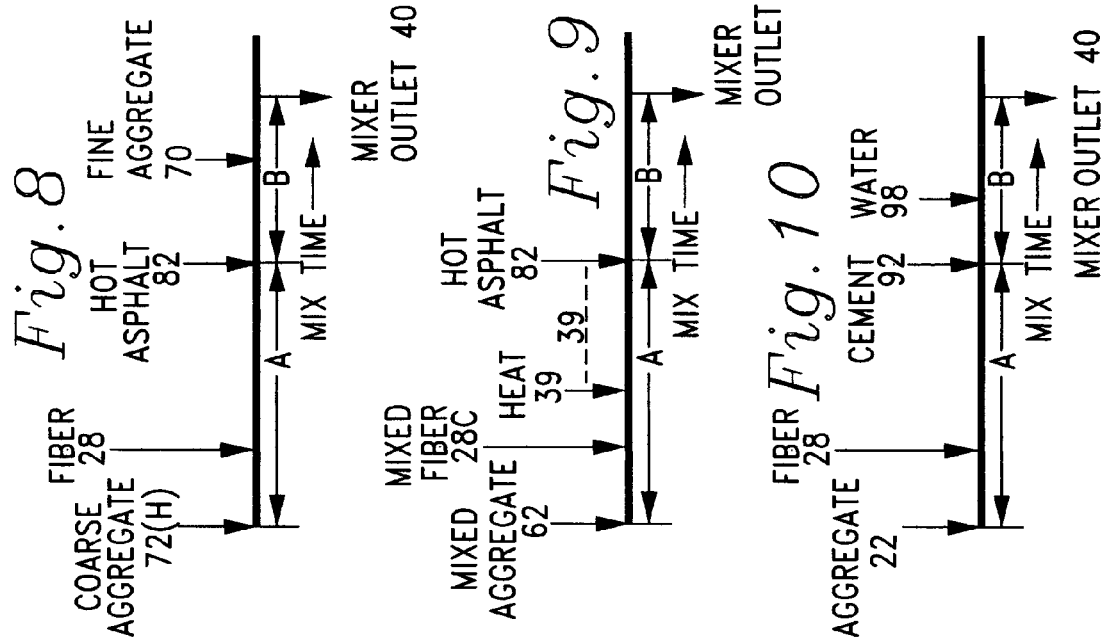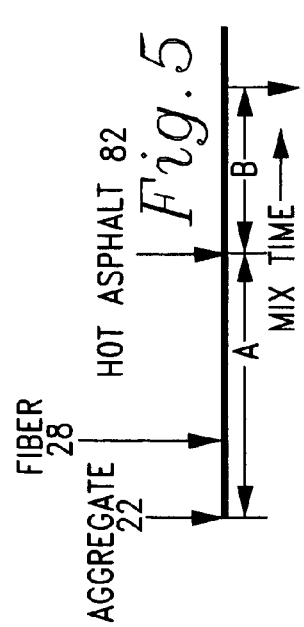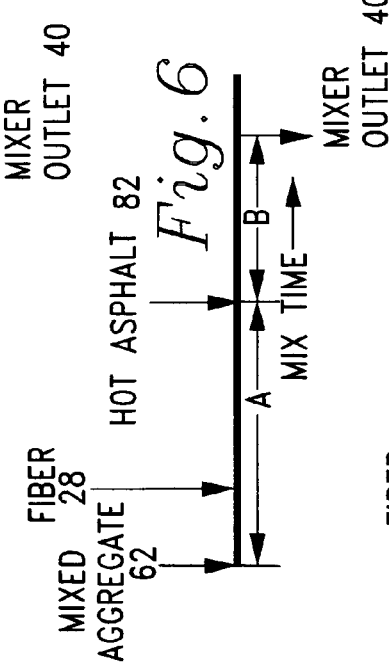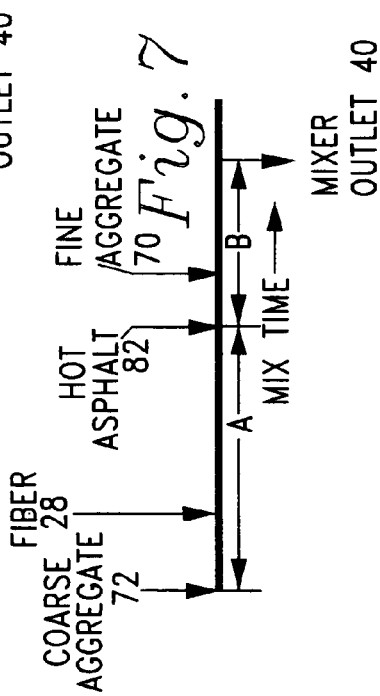

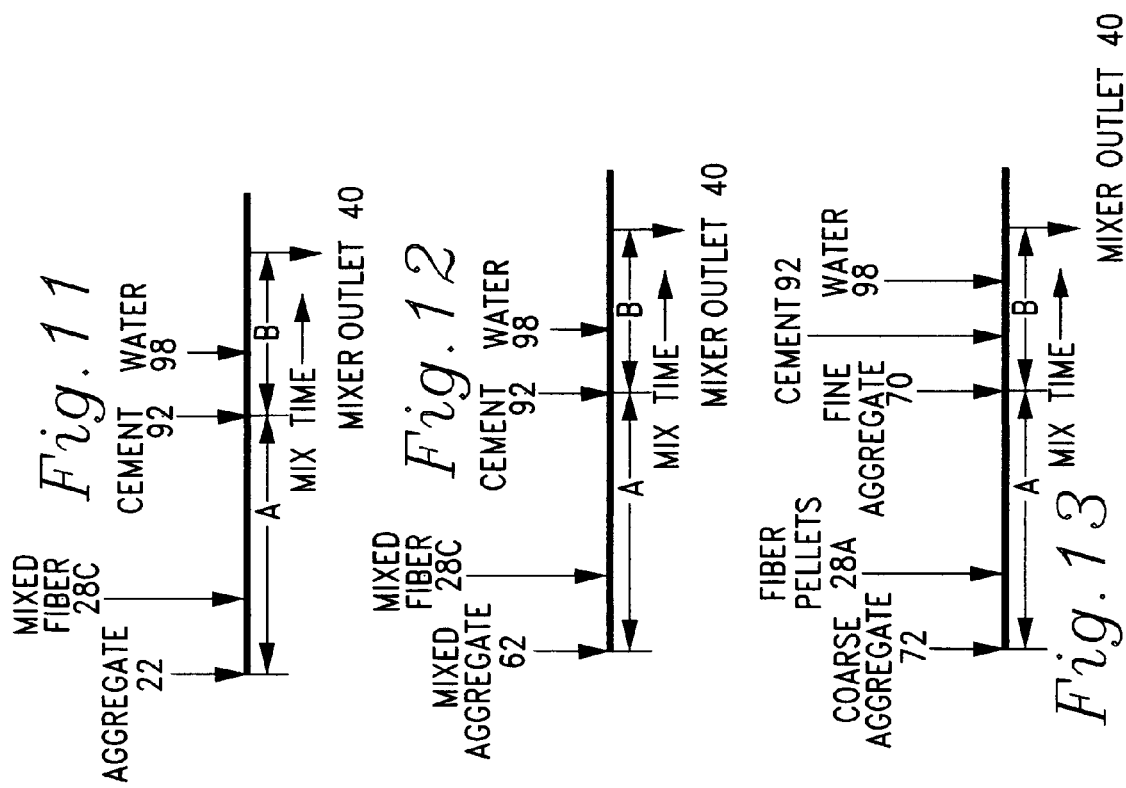

US 6,971,784 B1

PROCESS FOR PRODUCING FIBER REINFORCED HOT-MIX ASPHALTIC AND CEMENTITOUS STRUCTURAL MATERIALS WITH FIBER PELLETS PRODUCED FROM CARPET WASTE

CROSS REFERENCE TO RELATED APPLICATIONS

Applicant claims priority based on Provisional Patent Application bearing Ser. No. 60/424,279 filed Nov. 6, 2002 and on Provisional Patent Application bearing Ser. No. 60/408,764 filed Sep. 6, 2002.

FEDERALLY SPONSORED RESEARCH

Not applicable

SEQUENCE LISTING OR PROGRAM

Not applicable

BACKGROUND OF THE INVENTION

Field of the Invention

This invention relates to and teaches processes for making aggregate-containing hot-mix asphalt and cementitous structural materials that have reinforcing fibers extracted from fiber pellets formed from waste carpet materials or textiles substantially uniformly distributed throughout.

Effect on the Environment:

Thousands of tons of carpeting are annually removed from offices and homes and discarded in landfills as waste along with large quantities of waste textiles. Many of these carpets and textiles are fabricated from man-made fibers such as Nylon (linear polyamides), polypropylene and similar materials. These materials are not bio-degradable and therefore never decay or undergo any of the biological degradation processes. Instead they not only reside permanently in the landfill but are themselves destructive to the degradative processes normally expected to occur in such environments because they shield the degradable material under the discarded carpets from moisture and effective contact with other degradable materials.

One manufacturer has developed a process for recycling the material in waste carpets by 'ginning' the carpet fibers and reassembling the extracted Nylon (linear polyamides) fibers in small pellets bound together by the polypropylene carpet component. While this process incurs an expense, the resulting pellets are considered suitable landfill material since they do not impede moisture flow within the landfill, even though the pellets themselves do not biologically degrade.

Economics

The present invention sets forth processes for employing the fibers embedded within the waste carpet pellets or textile pellets as a fiber source for improving the static and dynamic physical properties of structural entities such as asphalt and concrete roadbeds and concrete beams and piers and other concrete structural elements.

Important economic benefits arise from improvements in the static and dynamic physical properties of road construction and surfacing materials. These economic benefits are related to the longer life of the road surfaces, the reduced annual costs for maintenance and replacement and the avoidance of economic loss arising from traffic congestion and delays that occur during the periods required for road surface repair and replacement.

The use of high quality fibers, such as Nylon (linear polyamides), for this purpose has been limited for two reasons: first has been the relatively high cost of the Nylon (linear polyamides). Virgin Nylon fiber (linear polyamides) now costs about $1.00 per pound. Second is the difficulty of handling, feeding and mixing loose fibers from any source into either hot asphalt liquid or into concrete mix prior to their application.

Waste Nylon (linear polyamides) carpets and textiles have been a potential resource for such reinforcing fibers since the carpets contain about 50% Nylon fiber (linear polyamides), 10% polypropylene used in the backing along with styrene-butadiene polymer and calcium carbonate.

The carpet reclaiming process yields a fluffy, curly fiber that is difficult to handle, and difficult to dispense reliably and accurately. Further, the loose fibers are easily inhaled and such inhalation by workers may have serious health and therefore economic implications.

Because the cost of forming the pellets is substantially offset by the abrogated cost of disposing of the carpet or textile in landfills, the reclaimed carpet Nylon fibers (linear polyamides) in pellet form are relatively low cost. Also, the tubular Nylon (linear polyamides) carpet pellets flow freely through typical hoppers compared with the fluffy, curly virgin or the 'ginned' fibers reclaimed from the carpets.

Prior Art

Fiber binders have been known to have been used in thermally or chemically hardening materials to improve their strength, flexibility and resistance to cracking. The State of Ohio publishes Standard #400HS titled, "Standard Specification for Asphalt Concrete—High Stress using Polyproplyene Fibers." The use of fiber bearing Acrylic Fill for coating tennis courts is promoted by Vanve Brothers, Inc. Of Kansas City, Mo. 3M has published an advertising piece reporting on the use of its polyolefin fibers as reinforcement in Portland cement (ASTM C150) concrete installed on a stretch of U.S. Highway #83 bridge structure over highway I-90 South of Pierre, S. Dak. No method for applying the fibers is taught.

U.S. Pat. No. 5,028,266 by Stephen Rettenmaier teaches the use of 'granulates' comprising cellulose fibers held together by bitumen or other petroleum product that dissolve in hot petroleum asphalt. A mix of equal weights of the fibers and the bitumen are extruded and chopped into lengths. Rotenmaier relies on the heat and solvent action of the hot asphalt to disrupt his granules. Rettenmaier does not teach the use of his 'granulates' in Portland cement concrete (ASTM C150).

OBJECTS AND ADVANTAGES

The processes disclosed and taught herein provide important environmental and economic advantages in the application of waste carpet to congealable construction materials. Specific advantages and objects are:

a. to employ the fiber extracted from waste carpeting or textiles as a reinforcing element in elements formed from aggregate bearing hot asphalt materials;

b. to employ fibers released from fiber pellets formed from fibers extracted from such waste carpets in aggregate bearing hot asphalt materials;

c. to provide a process for releasing the fibers from such pellets before combination with hot asphalt liquid;

d. to provide a process for releasing fibers from such pellets by mixing, grinding or otherwise agitating the pellets in contact with aggregate materials used in hot asphalt materials;
e. to substantially uniformly distribute fibers released from such pellets throughout aggregates prior to the step of mixing the fiber-bearing aggregates with hot asphalt liquid;
f. to release such fibers from fiber pellets by mixing, grinding or otherwise agitating the pellets with the coarse component only of aggregates having a fine and a coarse component, prior to mixing the fiber bearing aggregate with the hot liquid asphalt;
g. to provide improved physical properties of the congealed materials made by the process;
h. to allow the constructive use of non-degradable materials that otherwise would occupy landfills;
i. to secure improvement in the distribution of the fibers through the congealable materials by mixing the fibers first with the aggregate;
j. to provide improved handling and metering of the fibers by the use of fibers in pellet form;
k. to provide means for mechanically disrupting the fiber pellets into their individual fibers;
l. to perform the mechanical mixing and disrupting of the fiber and their pellets without liquid or before the insertion of the congealable materials;
m. to provide such process for use with hot asphalt;
n. to provide such process for use with concrete.
   o. to improve the accuracy of metering fibers into the processes by the use of fibers formed into pellets.
p. to provide such processes where the binding material for the pellets is derived from the same source as the fiber.
q. to employ pellets where the binding material is polypropylene.
r. To employ pellets formed with any suitable binding material.
s. to provide fiber pellets for the processes where the binding material is non-bituminous.

Other objects and advantages will be evident as the processes and their details are disclosed.

SUMMARY OF THE INVENTION

A multi-step process for providing with fiber reinforcement congealable materials that include aggregate such as hot liquid asphalt or Portland Cement (ASTM C150) concrete. The process includes the steps of: providing a source of aggregate material and a source of fiber that is primarily derived from waste carpeting or waste textiles; providing a source of congealable material; providing means such as a rotary drum for mixing materials, then dispensing a quantity of aggregate material and fiber into the mixer and mixing them before any liquid or congealable material is added. The dry mixing of the fiber and aggregate disperses the fiber and breaks up fiber clumps. Finally the congealable material is added to the mixer and mixed with the aggregate and fiber causing the fiber and aggregate to be distributed uniformly through the mix.

Asphalt Current Usage

A typical road employing hot-mix asphalt has about 93% aggregate of stones, sand and recycled waste materials. Typically six percent (6%) by weight of the final mixture is the liquid asphalt binder.

Where fibers are required, polyester is used at the rate of 6 pounds fiber per ton of total mix or 5% by weight of the liquid asphalt.

The fiber pellets formed from waste carpet typically have a cylindrical shape and are about 0.25 inches in diameter and 0.25 to 0.5 inches long. Analysis of the fibers within the pellets shows the fiber length as 4.8 mm+/−2.7 mm. A sample of this pelletized carpet weighs in the range of 16–26 lb/cu.ft. and has an average composition of Nylon (linear polyamides) fiber—45%; polypropylene 10% styrene-butadiene polymer 9% and calcium carbonate 36%. The polypropylene acts as the binder for the fibers. Polypropylene melts at about 320F while the Nylon (linear polyamides) melts in the range of 530–540F.

Polyester fiber is supplied in bags as a loose, fluffy bulk material. It is difficult to precisely meter or feed such loose fiber into a process or a metered asphalt flowstream. Therefore it is common to pre-mix the fiber in the liquid asphalt in vats or tanks that are equipped with costly integral motor driven mixers. Further, in this process there is no certainty of the uniform distribution of the fibers throughout the liquid asphalt in the vat.

The main drawback of the vat process is the need for providing the fiber in the correct ratio of fiber to asphalt. Therefore, adding fresh asphalt liquid to the pre-mix requires precise measurement of the liquid asphalt added in order to also add the right additional amount of fiber.

Further, it has been found difficult to maintain the fiber uniformly mixed or distributed throughout the asphalt within the tank since most fibers have a slightly different density than the liquid asphalt and therefore have a tendency to separate from the bulk of the liquid asphalt.

Concrete Current Usage:

Steel and other fiber binders have been experimentally used in Portland cement (ASTM C 150 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition.") concrete products to improve their physical properties.

A typical road, building beam or other structural element or foundation employing Portland Cement (ASTM C150) concrete has about 85% aggregate of stones and sand with only about 15% of the concrete mix being the Portland Cement (ASTM C150) or other cementitous binder.

Typical fiber concentrations that have been successfully employed in fiber reinforced concretes range from 20 to 30 pounds fiber per cubic yard finished concrete. Polyester or polyolefin fibers have been applied at the rate of 10–20 pounds fiber per cubic yard (pcy) of total mix. Not only have these fibers been costly, they have been applied as a loose fluffy material that is difficult to meter or feed precisely into a process. Since the loose fiber is difficult to handle, to meter or feed, it is premixed with the cement powder or simply mixed into the final product. This process causes haphazard distribution of fiber throughout the batch.

Applying fibers to the cement powder requires the hopper to have an integral mixer which is costly to secure and awkward to operate. Further, since loose fibers have a tendency to clump, uniform feeding of the loose fibers and uniform distribution of the fibers through the cement powder or the final product has been uncertain.

BRIEF DESCRIPTION OF THE DRAWINGS

In the drawings, the figures illustrate fiber sources and means for dispensing them. Since all the processes require mixing the second mixture before it is applied to the application, the description of some of the processes omit this detail.

FIGS. 1, 2 and 3 display the sources of the various materials such as aggregate 20, fiber 26 and hot asphalt 80. The numbers of the outlet conduits for each such as aggregate 22, fine aggregate 70 and hot asphalt 82 are employed to designate both the dispensing step and the related source.

FIG. 1 shows rudimentary views of source, dispensing, mixing and heating components employed in the processes of the invention.

FIG. 2 illustrates components for receiving, heating, separating and dispensing fine and coarse materials.

FIG. 3 teaches the feeding of fiber in pellet and/or fluffy form from the two hoppers under the control of metering elements.

FIGS. 4 through 13 are timelines showing visually the analog characterizations of the times for the material input from the sources, the mixing, heating and dispensing.

DEFINITIONS

The art of preparing and dispensing fluid but hardenable materials into forms or onto surfaces is old. However, the art has evolved to use lower cost, more highly available and more effective materials.

While the making of concrete from powders that congeal or set when combined with water is old, the sources of the powders has evolved from powders produced only by the burning or calcining of limestone (including Greek Statuary) to the use of pulverized coal ash and other materials as cementitous ingredients, thereby lowering the cost of the product and minimizing the volume otherwise occupied by the ash or other materials in landfills or their historical equivalents.

Therefore, the term cement powder employed herein is intended to apply to powders or slurries of powders that, when mixed with water, harden to a useful degree. These powders could be limestone cement, coal ash or a mixture of these or none of these with or without other ingredients that are deemed economically or mechanically useful in the mix.

The process for producing aggregates almost always produces a mixture of coarse and fine aggregates. It is intended that fine aggregates may include sand or other fine materials. It is not otherwise the intention of this specification to specify the dividing size between fine and coarse aggregates or to specify their relative proportions in the concrete mix since these ratios depend on the applications.

Since it is a primary objective of the invention to employ waste carpet in the form of pellets in the described processes, it must be understood that the manufacture, transportation and storage of the pellets will almost always cause some free, non-pelletized fiber to be mixed in with the bulk of the pellets. Therefore the use of the terms pelletized carpet fibers or carpet pellets or some other reference to pellets must be understood to always include a percentage of loose or fluffy fibers. In some cases it may be advisable to use a portion of fibers in pelletized or non-pelletized form whose source may be other than carpets or textiles. The use of the term 'fibers' is intended to refer to these.

This specification is not intended to provide specific formulae or ingredient ratios. It is generally intended that standard ingredient ratios as defined in concrete handbooks be employed. However, in order to meet strength, flowability and other standard requirements, some variation in component ratios may be necessary.

The use of the term 'cement' or 'cement powder', is intended to refer to cement powder including Portland Cement (ASTM C150) powder or cementitious powders from other sources.

The term 'source' is intended to be any stock of material. A source may be in the form of a mound or pile or in the form of material held in a container or vessel or railcar or truck. FIGS. 1, 2 and 3 display the sources of the various materials such as aggregate 20, fiber 26 and hot asphalt 80. The numbers of the outlet conduits for each such as aggregate 22, fine aggregate 70 and hot asphalt 82 are sometimes employed to designate both the dispensing step and the related source.

The term 'dispense' is intended to refer to delivery of material to the process in any manner.

The term 'conduit' as employed herein is intended to refer to any means of transferring material from one place to another.

A metering or flow control device or process step is intended to refer to and include any means of controlling, measuring or estimating the amount transferred. Such a device may be a flow control valve or a measured volume, including, for instance, the volume of a bucket of a back hoe or a bin gate.

A congealable material is any material that is initially flowable or mixable including powders and liquids, that hardens after a time or after mixing with water or after exposure to a process such as heating, cooling or exposure to ultra violet radiation.

DETAILED DESCRIPTION OF THE INVENTION

A preferred embodiment of the invention is described as follows with reference to FIG. 1. Aggregates such as crushed rock, crushed concrete, cinders etc. are stored in source 20 and metered via device 24 through conduit 22 to mixer 38.

Fiber pellets are dispensed at the rate of 40 to 60 pounds pellets per cubic yard of final (second) mix, from source 26 through metering device 30 through conduit 28 to mixer 38 thereby forming a first mixture. The sources of fiber from which the pellets are produced are either waste carpeting 18 or waste textile 19 or a mixture of them.

The mixer is caused to operate for a time period (see FIG. 5 for example) in the range of 30 seconds to 5 minutes. The duration of the time period depends on the fiber content of the pellets, typically 40 to 50 percent fiber, and the binding characteristic of the pellets, the speed of the mixer and the size range of the aggregates. It would be expected that a user would sample this first mixture after a mixing period to determine the approximate fraction of the pellets that had been disrupted into the form of individual fibers and to extend the period if a higher fiber yield was required in order to provide the desired fiber concentration, typically 20 to 40 pounds of fiber per cubic yard of final mix.

After a mixing time during which the pellets in the first mixture have been sufficiently abraded to release the desired concentration of loose fiber, congealable material from source 32 is dispensed via metering device 36 and conduit 34 into mixer 38 to form the second mixture. After a brief mixing period, the thoroughly mixed second mixture is dispensed to the application.

While the above process has been described in terms of a batch process, the following description relating to FIG. 1 applies equally well to a continuous process. For example, mixer 38 is a long rotating heatable kiln that is pitched in the direction of flow. Aggregate 20 is continuously metered into the entering or high end of the kiln along with a continuous metered flow of fiber pellets 26 or 26A, thereby forming a first mixture. As the kiln rotates, the first mixture moves in a stream to a midpoint in the rotating kiln where a congealable material such as hot asphalt 82 (FIGS. 5–8) is added via control 84 and conduit 82, thereby forming a second mixture. The stream comprising the second mixture continues moving toward the low end of the kiln while the mixing of the congealable material and the ingredients of the first mixture are thoroughly performed. At the low end of the kiln the thoroughly mixed second mixture is continuously discharged 40 to storage or the application 39. The continuous process continues until the dispensing of the ingredients in discontinued.

In a second embodiment of the invention the first mixture described in the first embodiment is mixed with congealable material in the form of cementitious powder and water. The cementitous powder, hereafter characterized as cement or cement powder, is fed from hopper 90 into the mixer 38 via control 94 and conduit 92 and water is fed from hopper 96 substantially simultaneously with the cement powder into mixer 38 via control 100 and through conduit 98, thereby forming a second mixture.

The second mixture is mixed for a sufficient time to secure the desired mixing of the constituents and then the second mixture is dispensed to transportation or storage means or directly to the point of application for road bed or structural components.

In a third embodiment, also displayed in FIG. 1, the aggregate from 20 is dispensed via conduit 22 to mixer 38 substantially simultaneously with fiber from source 26 dispensed via conduit 28 and the cement powder from source 90 via conduit 92 and metered by element 94 thereby forming a first mixture. The first mixture is then mixed in mixer 38 for a time period during which the fiber pellets are disrupted into their fiber and other constituents and the cement is distributed throughout the first mixture. Water, now being the congealable material, is added via conduit 98 from source 96 through metering device 100, thereby forming the second mixture. The second mixture is then mixed for a brief period and dispensed to the application.

In a fourth embodiment of the invention exhibited in FIG. 1 the fiber pellets and the aggregate are dispensed as described in connection with the first and second embodiments to form a first mixture. After appropriate mixing time has elapsed, the congealable material, hot liquid asphalt, is dispensed into mixer 38 from source 80 via control 84 and conduit 82, thereby forming the second mixture. The second mixture is then mixed for an appropriate time, determined by experience, before being dispensed to the application.

A fifth embodiment of the invention is displayed in FIG. 2, in connection with FIG. 1. In FIG. 2 there is shown a source of mixed aggregate 60. The mixed aggregate contained in source 60 has both coarse and fine components or particles. A heater 61 is provided whereby the contents of source 60 may be heated either directly or indirectly. Where heating has occurred the source is designated by H as 62H for heated mixed aggregate, 70H for heated fine aggregate and 72H for heated coarse aggregate. The mixed aggregate in source 60 is fed through control 64 into screening device 66 via conduit 62. The screening device 66 has positioned therein screen 58 having openings that pass the desired range of small sizes and retain, or fail to pass, larger aggregate particles. As required, coarse aggregate particles are dispensed through flow control 74, via conduit 72 into the process. In like manner, fine aggregate is dispensed via conduit 70, through flow control 71 into the process. In some embodiments of the invention the mixed aggregate 62 is dispensed directly into mixer 38 with fiber 28 or 28C to form the first mixture.

In the sixth embodiment of the invention only coarse aggregate is dispensed from source 60 through the screening mechanism 66 and control 74 and conduit 72 to mixer 38. Fiber pellets from source 26 are dispensed through control 30 in the required amount via conduit 28 to mixer 38, thereby forming the first mixture. Other dry ingredients may also be added such as cement powder, fine aggregate or other dry materials as described in connection with the prior embodiments. After a mixing time period ranging from 30 seconds to ten minutes, congealable material is added. The congealable material may be selected from the group comprising hot or cold liquid asphalt, water only or cement and water, thereby forming a second mixture. After the required mixing period, the second mixture is dispensed to the application.

Referring now to FIG. 3 there is shown two adjacent fiber sources, 26A for fiber pellets and 26B for fluffy or non-pelletized fibers. The fluffy fibers may have as their source waste carpet, waste textiles or non-waste materials including stainless steel fibers or fibers from natural sources such as cotton, wool, jute or hemp. The flows and therefore the proportions of the pellets and the fluffy fibers are regulated by flow controls 30A and 30B, respectively and are dispensed via outlet conduits 28A and 28B into combined outlet conduit 26C.

Referring now to FIG. 4, there is displayed a shorthand representation of one manifestation of the process where aggregate 22 and fiber 28 are dispensed substantially simultaneously into mixer 38 (not shown in the short-hand figures). The initial dry materials comprising the first mixture are mixed for time period A at the conclusion of which congealable material 34 is added to form the second mixture. The second mixture is mixed for time period B at the conclusion of which the second mixture is dispensed via conduit 40 to the application.

In FIG. 5 there is shown the process where the congealable material is hot or cold liquid asphalt 82 that is mixed into the first mixture of aggregate 22 and fiber 28 after mixing period A.

In FIG. 6 the process is displayed where mixed aggregate 62 and pellets 28A are dispensed into mixer 38 to form the first mixture and hot asphalt liquid 82 is added to form the second mixture after the first mixture has been mixed for time period A. It should be understood that the dispensing designation 28A does not suggest that there is deliberate mixing of fluffy fiber with fiber pellets, only that some loose or fluffy fiber is actually present with the pellets. A variation in this process has the first mixture formed of aggregate and some deliberate ratio of fluffy fiber 28B and pellets 28A, the fiber mixture designated as 28C.

In FIG. 7 the first mixture is formed of coarse aggregate 72 and pellets with some fluffy fiber 28C. After the mixing period A both hot or cold asphalt 82 and fine aggregate 70 are added to form the second mixture.

FIG. 8 shows that hot coarse aggregate 72H and fiber pellets 28C form the first mixture and that, after mixing, hot fine aggregate 70H and hot asphalt liquid 82 are added to form the second mixture.

In FIG. 9 there is shown the process where a mixture of coarse and fine aggregates 62 plus pellets 28C form the first mixture and that heater 39 is energized acting on the materials being mixed in mixer 38 and heating them during the mixing process. Hot asphalt 82 is added to form the second mixture. The action of heater 39 may be continued during mixing period B if desired.

FIG. 10 teaches that aggregate 22 plus fiber 28 are dispensed to form the first mixture and that cementitous material 92 including but not limited to Portland Cement (ASTM C150) powder and water are added to form the second mixture after the initial mixing period A.

In FIG. 11 the process is shown where aggregate 22 and pellets 28C, possibly but not necessarily having some fluffy fiber, are mixed, forming the first mixture. Cement 92 and water 98 are added to the first mixture after the mixing period A to form the second mixture.

In FIG. 12 a mixture of coarse and fine aggregates 62 and fiber pellets 28C form the first mixture and cement 92 and water 98 are subsequently added to form the second mixture.

FIG. 13 displays the first mixture comprising coarse aggregate 72 and fiber 28. The second mixture is formed when the fine aggregate 70, cement 92 and water 98 are added.

FIGS. 1 and 3, with reference to time line of FIG. 6, illustrate the process for producing asphalt concrete having both aggregate and fiber produced from fiber pellets whose fiber source is either or both waste carpeting or waste textile. As a first step the pellets 28A or 28 and the aggregate 22 are delivered to mixer 38 thereby forming the first mixture. The first mixture is then mixed by mixer 38 for a time period A sufficient for a substantial portion of the fibers in the pellets to have been abraded away from the pellets and for such fibers to be distributed throughout the first mixture. At that time hot liquid asphalt 82 is added to the first mixture, thereby forming the second mixture. The second mixture is mixed in mixer 38 or in another mixer not shown for time period B sufficient for the hot asphalt to be distributed throughout the second mixture and to coat the aggregate 22 and the fiber resulting from the disruption of pellets 28 or 28A. The resulting mix is then dispensed to storage or directly to the application.

In all the embodiments of the disclosed process, the mixer initially operates dry, with the various aggregate compositions and the pellets but without the addition of any liquid. The mixer acts to grind the pellets with the coarse aggregate while simultaneously mixing the freed fibers released from the pellets into the dry batch. After a brief mixing period, typically 30 seconds to 10 minutes, during which the dry mixer operates to thoroughly disrupt the pellets into their constituent fibers and mix the fibers through the aggregate and cement powder, water is introduced in the required measured amount via control 100. After a further brief mixing period the Portland Cement (ASTM C150) concrete mix is ready to apply to or transport to the application. The grinding and mixing action of the mixer or mixer drum 38 on the aggregate, cement powder and pellet mixture causes the pellets to become completely disrupted and the fibers blended with the aggregate and cement powder. The Nylon (linear polyamides) fibers, having been disrupted from the pellets by the grinding action of the aggregate, are thereby uniformly distributed throughout the entire Portland Cement (ASTM C150) concrete mix which is then delivered to the road or application via conduit 40 as final Portland Cement (ASTM C150) concrete.

In a final disclosure I teach the use of the raw bulk fiber, either as manufactured by 3M or as separated by ginning from the waste carpet, instead of pellets, in each of the processes, prior to addition of water or other congealable material.

From the foregoing description, it can be seen that the present invention comprises an unusual and unobvious method for minimizing the deposition of waste carpets and waste textiles in land fills and simultaneously improving the quality of structural material. It will be appreciated by those skilled in the art that changes could be made to the embodiments described in the foregoing description without departing from the broad inventive concepts thereof. It is understood, therefore, that this invention is not limited to the particular embodiment or embodiments disclosed, but is intended to cover all modifications which are within the scope and spirit of the invention as claimed and equivalents thereof.

I claim:

1. A process for providing congealable materials having fiber reinforcement and aggregate content, said process comprising the steps of:
   a. providing a source of aggregate material;
   b. providing a source of fiber, said fiber having a primary source selected from the group consisting of: waste carpeting and waste textiles;
   c. providing a source of congealable material;
   d. providing means for mixing granular materials and for mixing together granular and liquid materials;
   e. dispensing a first quantity of aggregate material into said mixing means;
   f. dispensing a first quantity of fiber into said mixing means;
   g. mixing together said fiber and aggregate whereby the fiber is ground and distributed throughout said aggregate, thereby forming a first mixture and
   h. dispensing and mixing a first quantity of congealable material into said first mixture whereby said aggregate and fiber are distributed throughout the congealable material, thereby forming a second mixture comprising congealable material having fiber reinforcement derived principally from waste carpet and aggregate content distributed throughout.

2. A process as recited in claim 1 further including the step of providing and dispensing asphalt as the congealable material.

3. A process as recited in claim 2 further providing that the asphalt is a hot liquid.

4. A process as recited in claim 3 where a portion of the fiber is in the form of pellets.

5. A process as recited in claim 4, further providing that the aggregate comprises a mixture of coarse aggregate and fine aggregate.

6. A process as recited in claim 5 further providing the steps of separating the fine aggregate from the coarse aggregate and dispensing the coarse aggregate only into the mixer to form the first mixture and dispensing the fine aggregate into said mixer substantially simultaneously with the hot liquid asphalt.

7. A process as recited in claim 5, further providing the steps of: heating the aggregate mixture, separating the coarse aggregate from the fine aggregate; dispensing the hot coarse aggregate into the mixer with the fiber pellets and dispensing the hot fine aggregate into the mixer substantially simultaneously with the hot liquid asphalt.

8. A process as recited in claim 5, further providing the steps of dispensing the coarse and fine aggregates into the mixer substantially simultaneously with the fiber pellets to form the first mixture and heating the first mixture prior to the dispensing of the hot liquid asphalt into the first mixture to form the second mixture.

9. A process as recited in claim 1 further including the steps of providing a source of cementitious material and a source of water and dispensing the water as the congealable material after the mixing step.

10. A process as recited in claim 9 where a portion of the fiber is in the form of pellets.

11. A process as recited in claim 10 further providing the step of dispensing the cementitous material along with the aggregate and fiber to form the first mixture.

12. A process as recited in claim 10 further providing the step of dispensing the cementitous powder along with the water to form the second mixture.

13. A process as recited in claim 9, further providing that the aggregate comprises a mixture of coarse aggregate and fine aggregate.

14. A process as recited in claim 13 further providing the steps of separating the fine aggregate from the coarse aggregate and dispensing the coarse aggregate only into the mixer to form the first mixture and dispensing the fine aggregate into said mixer substantially simultaneously with the water and cementitous material.

15. A process for providing fiber content in hot-mix asphalt materials having aggregate content, said process comprising the steps of:
   a. providing a source of aggregate;
   b. providing a source of fiber in pellet form, said fiber having a primary source selected from the group consisting of: waste carpeting and waste textiles;
   c. providing means for mixing granular materials and for mixing together granular and liquid materials;
   d. providing a source of a hot asphalt liquid;
   e. dispensing a first quantity of aggregate and a first quantity of fiber pellets into said mixing means;
   f. operating said mixing means whereby said first quantity of fiber pellets are ground and distributed throughout said aggregate, thereby forming a first mixture; and
   g. dispensing and mixing a first quantity of hot liquid asphalt into said first mixture whereby said aggregate and fiber are distributed throughout the hot asphalt thereby forming a second mixture comprising hot liquid asphalt having fiber reinforcement derived principally from waste carpet and aggregate content distributed throughout.

16. A process as recited in claim 15, further providing that the aggregate comprises a mixture of coarse aggregate and fine aggregate.

17. A process as recited in claim 16 further providing the steps of: separating the fine aggregate from the coarse aggregate, dispensing the coarse aggregate only into the mixer to form the first mixture, and dispensing the fine aggregate into said mixer substantially simultaneously with the hot liquid asphalt.

18. A process as recited in claim 16, further providing the steps of: heating the aggregate mixture, separating the coarse aggregate from the fine aggregate; dispensing the hot coarse aggregate into the mixer with the fiber pellets and dispensing the hot fine aggregate into the mixer substantially simultaneously with the hot liquid asphalt.

19. A process as recited in claim 16, further providing the steps of dispensing the coarse and fine aggregates into the mixer substantially simultaneously with the fiber pellets to form the first mixture and heating the first mixture prior to the dispensing of the hot liquid asphalt into the first mixture to form the second mixture.

20. A process for providing fiber content in cementitious materials having aggregate content, said process comprising the steps of:
   a. providing a source of aggregate;
   b. providing a source of fiber in pellet form, said fiber having a primary source selected from the group consisting of: waste carpeting and waste textiles;
   c. providing means for mixing granular materials and for mixing together granular and liquid materials;
   d. providing a source of cementitious powder;
   e. providing a source of water;
   e. dispensing a first quantity of aggregate and a first quantity of fiber pellets into said mixing means thereby forming a first mixture;
   f. operating said mixing means whereby said first quantity of fiber pellets are ground and fibers therefrom distributed throughout said aggregate;
   g. dispensing and mixing a first quantity of water into the mixer thereby forming a second mixture.

21. A process as recited in claim 20 further providing that the cementitous powder is dispensed with the fiber and aggregate to form the first mixture.

22. A process as recited in claim 21, further providing that the aggregate comprises a mixture of coarse aggregate and fine aggregate.

23. A process as recited in claim 22 further providing the steps of: separating the fine aggregate from the coarse aggregate, dispensing the coarse aggregate only into the mixer with the fiber to form the first mixture, and dispensing the fine aggregate into said mixer after the mixing period substantially simultaneously with the water.

24. A process as recited in claim 20, further provided that the cementitous powder is dispensed substantially simultaneously with the water.

* * * * *